(12) United States Patent
Bushman (10) Patent No.: US 10,437,687 B2
(45) Date of Patent: *Oct. 8, 2019

(54) FILTERING A DIRECTORY ENUMERATION OF A DIRECTORY OF AN IMAGE BACKUP

(71) Applicant: STORAGECRAFT TECHNOLOGY CORPORATION, Draper, UT (US)

(72) Inventor: Nathan S. Bushman, Pleasant Grove, UT (US)

(73) Assignee: STORAGECRAFT TECHNOLOGY CORPORATION, Draper, UT (US)

(*) Notice: Subject to any disclaimer, the term of this patent is extended or adjusted under 35 U.S.C. 154(b) by 281 days.

This patent is subject to a terminal disclaimer.

(21) Appl. No.: 15/362,323

(22) Filed: Nov. 28, 2016

(65) Prior Publication Data

US 2017/0262349 A1    Sep. 14, 2017

Related U.S. Application Data

(63) Continuation of application No. 15/068,162, filed on Mar. 11, 2016, now Pat. No. 9,619,335.

(51) Int. Cl.
| | |
|---|---|
| *G06F 16/00* | (2019.01) |
| *G06F 11/14* | (2006.01) |
| *G06F 16/11* | (2019.01) |
| *G06F 16/16* | (2019.01) |
| *G06F 16/51* | (2019.01) |
| *G06F 16/188* | (2019.01) |

(52) U.S. Cl.
CPC ...... *G06F 11/1469* (2013.01); *G06F 11/1451* (2013.01); *G06F 11/1464* (2013.01); *G06F 16/11* (2019.01); *G06F 16/113* (2019.01); *G06F 16/122* (2019.01); *G06F 16/16* (2019.01); *G06F 16/188* (2019.01); *G06F 16/51* (2019.01); *G06F 2201/80* (2013.01); *G06F 2201/84* (2013.01)

(58) Field of Classification Search
CPC .. G06F 11/1469; G06F 16/113; G06F 16/122; G06F 16/51; G06F 16/16; G06F 16/11; G06F 16/188; G06F 11/1451; G06F 11/1464; G06F 2201/80; G06F 2201/84
See application file for complete search history.

(56) References Cited

U.S. PATENT DOCUMENTS

2016/0232060 A1* 8/2016 Nanivadekar ....... G06F 11/1451

* cited by examiner

*Primary Examiner* — Alexander Khong
(74) *Attorney, Agent, or Firm* — Maschoff Brennan (57) ABSTRACT

Filtering a directory enumeration of a directory of an image backup. In one example embodiment, a method for filtering a directory enumeration of a directory of an image backup may include exposing an image backup to directory enumeration command with the image backup listing a particular file as existing in a directory of the image backup even though the file content of the particular file is missing from the exposed image backup, receiving a directory enumeration command corresponding to the directory of the exposed image backup, generating a filtered directory enumeration that excludes the particular file, and returning the filtered directory enumeration.

19 Claims, 4 Drawing Sheets

FILTERING A DIRECTORY ENUMERATION OF A DIRECTORY OF AN IMAGE BACKUP

CROSS-REFERENCE TO A RELATED APPLICATION

This application is a continuation of U.S. patent application Ser. No. 15/068,162, filed Mar. 11, 2016, which is incorporated herein by reference in its entirety.

FIELD

The embodiments disclosed herein relate to filtering a directory enumeration of a directory of an image backup.

BACKGROUND

A storage is computer-readable media capable of storing data in blocks. Storages face a myriad of threats to the data they store and to their smooth and continuous operation. In order to mitigate these threats, a backup of the data in a storage may be created to represent the state of the source storage at a particular point in time and to enable the restoration of the data at some future time. Such a restoration may become desirable, for example, if the storage experiences corruption of its stored data, if the storage becomes unavailable, or if a user wishes to create a second identical storage.

A storage is typically logically divided into a finite number of fixed-length blocks. A storage also typically includes a file system which tracks the locations of the blocks that are allocated to each file that is stored in the storage as well as the locations of allocated blocks which are used by the file system for its own internal on-storage structures. The file system may also track free blocks that are neither allocated to any file nor allocated to any file system on-storage structure. The file system generally tracks allocated and/or free blocks using a specialized on-storage structure stored in the file system metadata (FSM), referred to herein as a file system block allocation map (FSBAM).

Various techniques exist for backing up a source storage. One common technique involves backing up individual files stored in the source storage on a per-file basis. This technique is often referred to as file backup. File backup uses the file system of the source storage as a starting point and performs a backup by writing the files to a destination storage. Using this approach, individual files are backed up if they have been modified since the previous backup. File backup may be useful for finding and restoring a few lost or corrupted files. However, file backup may also include significant overhead in the form of bandwidth and logical overhead because file backup requires the tracking and storing of information about where each file exists within the file system of the source storage and the destination storage.

Another common technique for backing up a source storage ignores the locations of individual files stored in the source storage and instead simply backs up all allocated blocks stored in the source storage. This technique is often referred to as image backup because the backup generally contains or represents an image, or copy, of the entire allocated contents of the source storage. Using this approach, individual allocated blocks are backed up if they have been modified since the previous backup. Because image backup backs up all allocated blocks of the source storage, image backup backs up both the blocks that make up the files stored in the source storage as well as the blocks that make up the file system on-storage structures such as the FSM. Also, because image backup backs up all allocated blocks rather than individual files, this approach does not generally need to be aware of the file system on-storage data structures or the files stored in the source storage, beyond utilizing the FSBAM in order to only back up allocated blocks since free blocks are not generally backed up.

An image backup can be relatively fast compared to file backup because reliance on the file system is minimized. An image backup can also be relatively fast compared to a file backup because seeking is reduced. In particular, during an image backup, blocks are generally read sequentially with relatively limited seeking. In contrast, during a file backup, blocks that make up individual files may be scattered, resulting in relatively extensive seeking. Further, the use of snapshot technology during an image backup may enable an image backup to capture the data stored in a source storage at a particular point in time without interrupting other processes, thus avoiding downtime of the source storage.

One common problem encountered when backing up a source storage using image backup is the potential for the inclusion of unwanted files in the backups. For example, a very large digital movie file may initially be stored in a source storage. At the time of a backup of the source storage, a user may wish to delete the movie file in order to save space in the image backup(s) of the source storage. However, image backup methods do not generally allow individual files to be deleted from an image backup, and the file content of the unwanted file must therefore be needlessly retained in the image backup. Retaining unwanted file content in an image backup may increase the overall size requirements of a backup storage where the image backup is stored, increase the bandwidth overhead of transporting the image backup, and increase the processing time associated with exposing or restoring the image backup.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments described herein relate to filtering a directory enumeration of a directory of an image backup. The example methods disclosed herein may be employed to filter a directory enumeration to exclude files where the files are listed in file system metadata of an image backup but where the file content of the files was actually excluded from the image backup. The filtering of the example methods disclosed herein may enable a decrease in the overall size requirements of a backup storage where an image backup is stored, a decrease in the bandwidth overhead of transporting the image backup, and/or a decrease in the processing time associated with exposing or restoring the image backup.

In one example embodiment, a method for filtering a directory enumeration of a directory of an image backup may include exposing an image backup to directory enumeration command with the image backup listing a particular file as existing in a directory of the image backup even though the file content of the particular file is missing from the exposed image backup, receiving a directory enumeration command corresponding to the directory of the exposed image backup, generating a filtered directory enumeration that excludes the particular file, and returning the filtered directory enumeration.

In another example embodiment, a method for filtering a directory enumeration of a directory of an image backup may include restoring an image backup of a source storage to a restore storage with the restored image backup listing a particular file as existing in a directory of the restored image backup even though the file content of the particular file is missing from the restored image backup, receiving a directory enumeration command corresponding to the directory of the restored image backup, generating a filtered directory enumeration that excludes the particular file, and returning the filtered directory enumeration It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

The term "storage" as used herein refers to computer-readable media capable of storing data in blocks, such as one or more floppy disks, optical disks, magnetic disks, or solid state drives, flash storage devices, or some logical portion thereof such as a volume. The term "block" as used herein refers to a fixed-length discrete sequence of bits. In some file systems, blocks are sometimes referred to as "clusters." In some example embodiments, the size of each block may be configured to match the standard sector size of a storage on which the block is stored. For example, the size of each block may be 512 bytes (4096 bits) where 512 bytes is the size of a standard sector. In other example embodiments, the size of each block may be configured to be a multiple of the standard sector size of a storage on which the block is stored. For example, the size of each block may be 4096 bytes (32,768 bits) where 512 bytes (4096 bits) is the size of a standard sector, which results in each block including eight sectors. In some file systems, a block is the allocation unit of the file system, with the allocated blocks and free blocks being tracked by the file system. The term "allocated block" as used herein refers to a block in a storage that is currently tracked as storing data by a file system of the storage. The term "free block" as used herein refers to a block in a storage that is not currently tracked as storing data by a file system of the storage. The term "backup" when used herein as a noun refers to a copy or copies of one or more blocks from a storage. The term "full image backup" as used herein refers to a full image backup of a storage that includes at least a copy of each unique allocated block of the storage at a point in time such that the full image backup can be restored on its own to recreate the state of the storage at the point in time, without being dependent on any other backup. A "full image backup" may also include nonunique allocated blocks and free blocks of the storage at the point in time. An example file format for a "full image backup" is the ShadowProtect Full (SPF) image backup format. The term "incremental image backup" as used herein refers to an at least partial backup of a storage that includes at least a copy of each unique allocated block of the storage that was modified between a previous point in time of a previous backup of the storage and the subsequent point in time of the incremental image backup, such that the incremental image backup, along with all previous backups of the storage including an initial full image backup of the storage, can be restored together as an incremental image backup chain to recreate the state of the storage at the subsequent point in time. An "incremental image backup" may also include nonunique allocated blocks and free blocks of the storage that were modified between the previous point in time and the subsequent point in time. An example file format for an "incremental image backup" is the ShadowProtect Incremental (SPI) image backup format. The term "modified block" as used herein refers to a block that was modified either because the block was previously allocated and changed or because the block was modified by writing to a newly allocated block. The term "decremental backup" as used herein refers to an at least partial backup of a storage that includes at least a copy of each unique allocated block from a full image backup of the storage that corresponds to a block that was modified in the source storage between a previous point in time and a subsequent point in time, such that the decremental backup, along with all subsequent decremental backups of the storage, including a full image backup of the storage, can be restored together as a decremental image backup chain to recreate the state of the storage at the previous point in time. A "decremental backup" may also include nonunique allocated blocks and free blocks from a full image backup of the storage that correspond to blocks that were modified in the source storage between the point in time and the subsequent point in time. It is understood that a "full image backup," an "incremental image backup," and/or a "decremental backup" may exclude certain undesired allocated blocks such as blocks belonging to files where the file content of the files is not necessary for restoration purposes, such as virtual memory pagination files and machine hibernation state files. The term "file system metadata" or "FSM" as used herein refers to metadata maintained by a file system of a storage that tracks, at any given point in time, which blocks of the storage are assigned to each file of the storage and also maintains a file system block allocation map for the storage. The term "file system block allocation map" or "FSBAM" as used herein refers to a map maintained as part of the FSM of a storage that tracks, at any given point in time, which blocks of the storage are allocated and/or which blocks of the storage are free. The term "file exclusion policy" or "FEP" as used herein refers to a policy that defines which files of a storage should be excluded from a backup. It is understood that an FEP may be defined in terms of which files of a storage should be excluded from a backup, which files of a storage should be included in a backup (so that all other files can be excluded), or some combination thereof.

Figure 1:
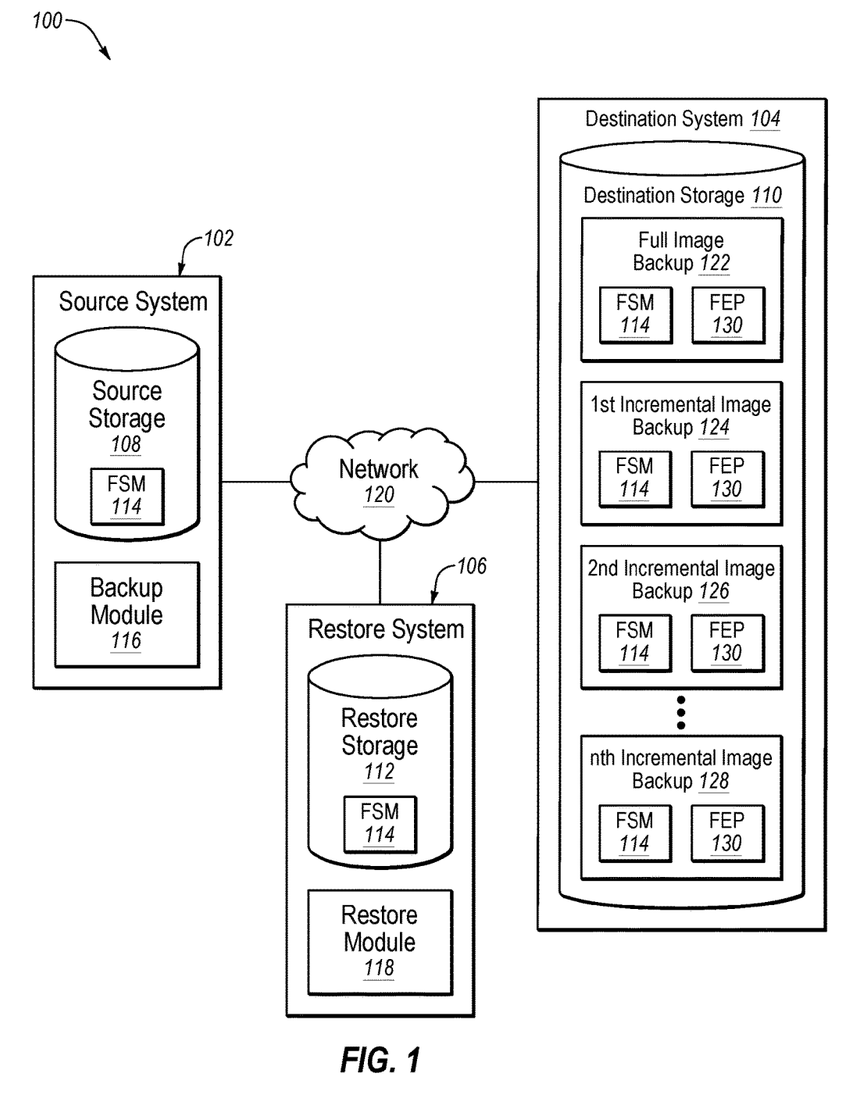
FIG. 1 is a schematic block diagram illustrating an example image backup and restore system.

FIG. 1 is a schematic block diagram illustrating an example image backup and restore system 100. As disclosed in FIG. 1, the example system 100 includes a source system 102, a destination system 104, and a restore system 106. The systems 102, 104, and 106 include a source storage 108, a destination storage 110, and a restore storage 112, respectively. The source storage 108 and the restore storage 112 both include file system metadata (FSM) 114. The systems 102 and 106 also include a backup module 116 and a restore module 118, respectively. The systems 102, 104, and 106 are able to communicate with one another over a network 120.

Each of the systems 102, 104, and 106 may be any computing device capable of supporting a storage and communicating with other systems including, for example, file servers, web servers, personal computers, desktop computers, laptop computers, handheld devices, multiprocessor systems, microprocessor-based or programmable consumer electronics, smartphones, digital cameras, hard disk drives, flash storage devices, and virtual machines. The network 120 may be any wired or wireless communication network including, for example, a Local Area Network (LAN), a Metropolitan Area Network (MAN), a Wide Area Network (WAN), a Wireless Application Protocol (WAP) network, a Bluetooth network, an Internet Protocol (IP) network such as the internet, or some combination thereof. The network 120 may also be a network emulation of a hypervisor over which one or more virtual machines and/or physical machines may communicate.

The destination storage 110 may store various backups of the source storage 108. For example, the destination storage 110 may store a full image backup 122, a 1st incremental image backup 124, a 2nd incremental image backup 126, and an nth incremental image backup 128, which together make up an incremental image backup chain. The incremental image backup chain stored in the destination storage 110 may be created by the backup module 116. For example, the backup module 116 may be one or more programs that are configured, when executed, to cause one or more processors to perform image backup operations of creating a full image backup and multiple incremental image backups of the source storage 108. It is noted that these image backups may initially be created on the source system 102 and then copied to the destination system 104.

For example, the full image backup 122 may be created to capture the state of the source storage 108 at time t(0). This image backup operation may include the backup module 116 copying all allocated blocks of the source storage 108 as allocated at time t(0), and storing the allocated blocks in the full image backup 122 in the destination storage 110. The state of the source storage 108 at time t(0) may be captured using snapshot technology in order to capture the blocks stored in the source storage 108 at time t(0) without interrupting other processes, thus avoiding downtime of the source storage 108. The full image backup 122 may be relatively large depending on the size of the source storage 108 and the number of allocated blocks at time t(0). As a result, the full image backup 122 may take a relatively long time to create and consume a relatively large amount of space in the destination storage 110.

Next, the 1st and 2nd incremental image backups 124 and 126 may be created to capture the states of the source storage 108 at times t(1) and t(2), respectively. This may include copying only modified allocated blocks of the source storage 108 as allocated at time t(1), and storing the modified allocated blocks in the 1st incremental image backup 124 in the destination storage 110, then later copying only modified allocated blocks of the source storage 108 as allocated at time t(2), and storing the modified allocated blocks in the 2nd incremental image backup 126 in the destination storage 110. The states of the source storage 108 at times t(1) and t(2) may also be captured using snapshot technology, thus avoiding downtime of the source storage 108. Each incremental image backup may include only those allocated blocks from the source storage 108 that were modified after the time of the previous image backup. Thus, the 1st incremental image backup 124 may include only those allocated blocks from the source storage 108 that were modified between time t(0) and time t(1), and the 2nd incremental image backup 126 may include only those allocated blocks from the source storage 108 that were modified between time t(1) and time t(2). In general, as compared to the full image backup 122, each incremental image backup may take a relatively short time to create and consume a relatively small storage space in the destination storage 110.

Finally, the nth incremental image backup 128 may be created to capture the state of the source storage 108 at time t(n). This may include copying only modified allocated blocks of the source storage 108 as allocated at time t(n), using snapshot technology, and storing the modified allocated blocks in the nth incremental image backup 128 in the destination storage 110. The nth incremental image backup 128 may include only those allocated blocks from the source storage 108 that were modified between time t(n−1) and time t(n).

During the creation of each of the image backups 122, 124, 126, and 128, a file system block allocation map (FSBAM) of the FSM 114 of the source storage 108 may be accessed at the time of the backup to determine which of the blocks of the source storage 108 are allocated at the time of the backup. A copy of the FSM 114 may also be stored with each of the image backups 122, 124, 126, and 128 to capture the state of the FSM 114 at the time of the backup. This copy may either be stored by virtue of each of the image backups 122, 124, 126, and 128 inherently including the FSM 114 in its backed-up blocks, or the copy may be stored separately, or both.

Also, during the creation of each of the image backups 122, 124, 126, and 128, a file exclusion policy (FEP) 130 for the backup may be employed to avoid backing up of unwanted file content. The FEP 130 may either be stored along with the image backups 122, 124, 126, and 128, or the FEP 130 may be stored separately, or both. By avoiding the backing up of unwanted file content, the overall size requirements may decrease for the destination storage 110 where the image backups 122, 124, 126, and 128 are stored, the bandwidth overhead of transporting the image backups 122, 124, 126, and 128 over the network 120 may decrease, and/or the processing time associated with exposing and/or restoring any of the image backups 122, 124, 126, and 128 may decrease.

Therefore, incremental image backups may be created on an ongoing basis. The frequency of creating new incremental image backups may be altered as desired in order to adjust the amount of data that will be lost should the source storage 108 experience corruption of its stored blocks or become unavailable at any given point in time. The blocks from the source storage 108 can be restored to the state at the point in time of a particular incremental image backup, minus any excluded file content blocks, by applying the image backups to the restore storage 112 from oldest to newest, namely, first applying the full image backup 122 and then applying each successive incremental image backup up to the particular incremental image backup. Alternatively, the blocks from the source storage 108 can be restored to the state at the point in time of a particular incremental image backup, minus any excluded file content blocks, by applying the image backups to the restore storage 112 concurrently, namely, concurrently applying the full image backup 122 and each successive incremental image backup up to the particular incremental image backup.

Although only allocated blocks are included in the example incremental image backups discussed above, it is understood that in alternative implementations both allocated and free blocks may be backed up during the creation of a full image backup or an incremental image backup. This is typically done for forensic purposes, because the content of free blocks can be interesting where the free blocks contain data from a previous point in time when the blocks were in use and allocated. Therefore, the creation of full image backups and incremental image backups as disclosed herein is not limited to allocated blocks but may also include free blocks.

Further, although only full image backups and incremental image backups are discussed above, it is understood that the source storage 108 may instead be backed up by creating a full image backup and one or more decremental image backups. Decremental image backups are created by initially creating a full image backup to capture the state at an initial point in time, then updating the full image backup to capture the state at a subsequent point in time by modifying only those blocks in the full image backup that were modified between the initial and subsequent points in time. Prior to the updating of the full image backup, however, any original blocks in the full image backup that correspond to the locations of the modified blocks are copied to a decremental image backup, thus enabling restoration of the source storage 108 at the initial point in time minus any excluded file content blocks (by restoring the updated full image backup and then restoring the decremental image backup, or by concurrently restoring the updated full image backup and the decremental image backup) or at the subsequent point in time minus any excluded file content blocks (by simply restoring the updated full image backup). Since restoring a single full image backup is generally faster than restoring a full image backup and one or more incremental or decremental image backups, creating decremental image backups instead of incremental image backups may enable the most recent image backup to be restored more quickly since the most recent image backup is always a full image backup instead of potentially being an incremental image backup. Therefore, the methods disclosed herein are not limited to implementation on incremental image backup chains, but may also include implementation on decremental image backup chains.

In one example embodiment, the destination system 104 may be a network server, the source system 102 may be a first desktop computer, the source storage 108 may be a volume on one or more magnetic hard drives of the first desktop computer, the restore system 106 may be a second desktop computer, the restore storage 112 may be a volume on one or more magnetic hard drives of the second desktop computer, and the network 120 may include the internet. In this example embodiment, the first desktop computer may be configured to periodically back up the volume of the first desktop computer to the network server over the internet as part of a backup job by creating the full image backup 122 and the multiple incremental image backups 124, 126, and 128 stored in the destination storage 110. The first desktop computer may also be configured to track incremental changes to its volume between backups in order to easily and quickly identify only those blocks that were modified for use in the creation of an incremental image backup. The second desktop computer may also be configured to restore one or more of the image backups from the network server over the internet to the volume of the second desktop computer if the first desktop computer experiences corruption of its volume or if the first desktop computer's volume becomes unavailable.

Although only a single storage is disclosed in each of the systems 102, 104, and 106 in FIG. 1, it is understood that any of the systems 102, 104, and 106 may instead include two or more storages. Further, although the systems 102, 104, and 106 are disclosed in FIG. 1 as communicating over the network 120, it is understood that the systems 102, 104, and 106 may instead communicate directly with each other. For example, in some embodiments any combination of the systems 102, 104, and 106 may be combined into a single system, including embodiments where the source storage 108 represents the same storage as the restore storage 112. Further, although the backup module 116 and the restore module 118 are the only modules disclosed in the system 100 of FIG. 1, it is understood that the functionality of the modules 116 and 118 may be replaced or augmented by one or more similar modules residing on any of the systems 102, 104, or 106 or another system. Finally, although only a single source storage and a single restore storage are disclosed in the system 100 of FIG. 1, it is understood that the destination system 104 of FIG. 1 may be configured to simultaneously back up multiple source storages and/or to simultaneously restore to multiple restore storages. For example, where the destination system 104 is configured as a deduplication system (that is capable of removing duplicate blocks within image backups and/or is capable of removing duplicate blocks between image backups), the greater the number of storages that are backed up to the destination storage 110 of the destination system 104, the greater the likelihood for reducing redundancy and for reducing the overall number of blocks being backed up, resulting in corresponding decreases in the overall size requirements of the destination storage 110 and in the bandwidth overhead of transporting blocks to the destination storage 110.

Having described one specific environment with respect to FIG. 1, it is understood that the specific environment of FIG. 1 is only one of countless environments in which the example methods disclosed herein may be practiced. The scope of the example embodiments is not intended to be limited to any particular environment.

Figure 2:
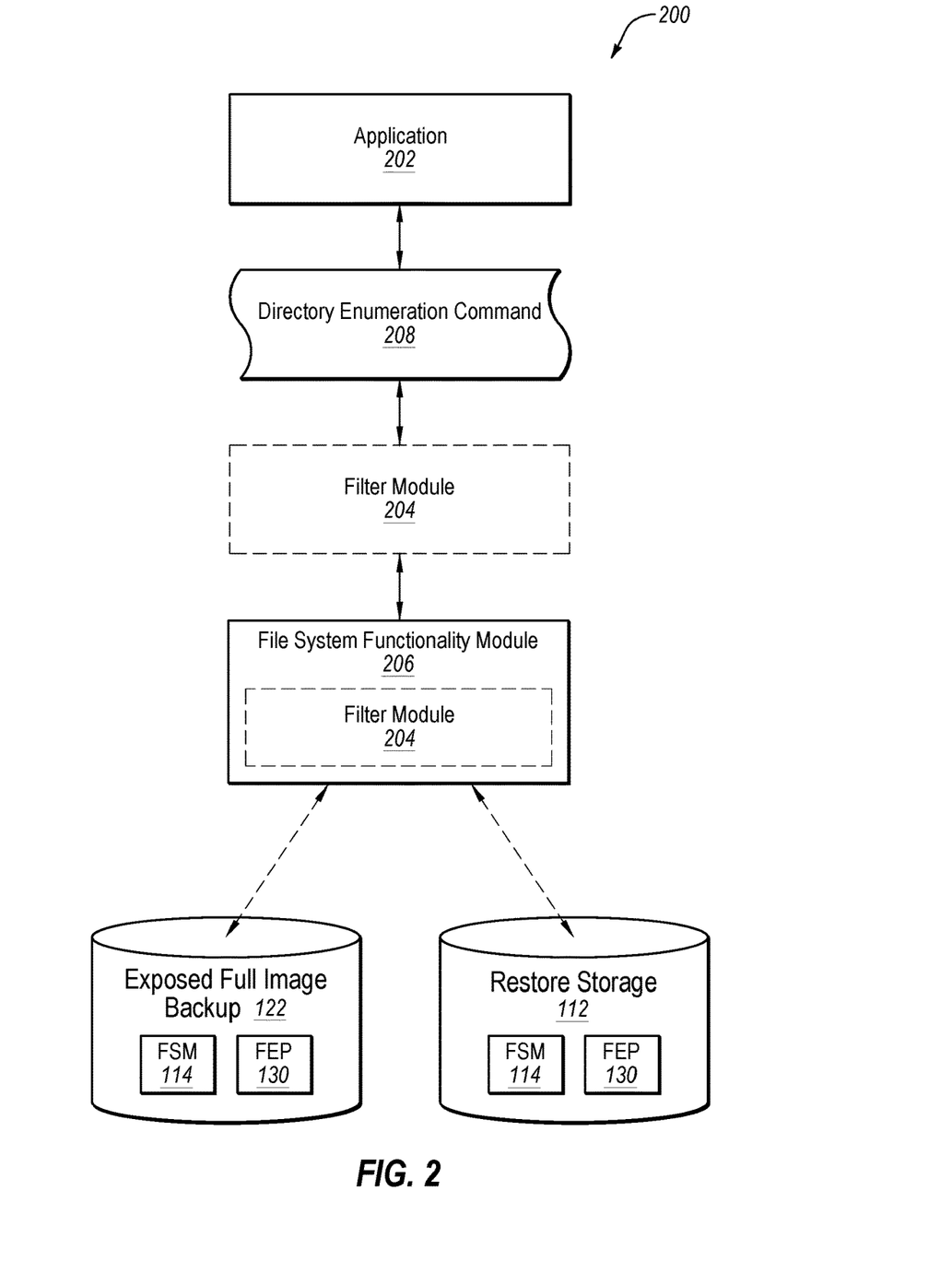
FIG. 2 is a schematic block diagram of a directory enumeration filtering system.

FIG. 2 is a schematic block diagram of a directory enumeration filtering system 200. As disclosed in FIG. 2, the example system 200 includes an application 202, a filter module 204, a file system functionality module 206, the restore storage 112, and an exposed version of the full image backup 122.

The exposed full image backup 122 of FIG. 2 may have been exposed to one or more file system commands, such as directory enumeration commands. Alternatively, the exposed full image backup 122 may instead be any of the 1st incremental image backup 124, the 2nd incremental image backup 126, or the nth incremental image backup 128 that has been exposed to directory enumeration commands. This exposure may be accomplished in a variety of ways, including mounting the full image backup 122 as a virtual device of a standard file system, or exposing the full image backup 122 to a particular software application, such as the application 202.

In contrast, the restore storage 112 of FIG. 2 may have had the full image backup 122 of the source storage 108 of FIG. 1 restored thereto. Alternatively, the restore storage 112 may have had any of the 1st incremental image backup 124, the 2nd incremental image backup 126, or the nth incremental image backup 128 of FIG. 1 restored thereto.

The file system functionality module 206 may be employed to generate a directory enumeration of a directory in either the exposed full image backup 122 or the restore storage 112. As disclosed in FIG. 2, the file system functionality module 206 may include the filter module 204, or the filter module 204 may be a separate module between the application 202 and the file system functionality module 206. In either case, the filter module 204 is able to intercept a directory enumeration command 208 sent from the application 202 to the file system functionality module 206. Although disclosed as a module with file system functionality, such as directory enumeration functionality, it is understood that the file system functionality module 206 may be an actual file system, such as a standard file system, instead of just a module that has the functionality of a file system.

The file system functionality module 206 may receive the directory enumeration command 208, and other directory enumeration commands, from the application 202, or from other applications, that are directed either to the exposed full image backup 122 or to the restore storage 112. In either case, the filter module 204 may be configured to intercept each directory enumeration command in order to filter the directory enumeration command itself, or the results of the directory enumeration command, so that the application 202 may receive a filtered directory enumeration that excludes files where the files are listed in FSM 114 for the directory of the file system of the exposed full image backup 122 or of the restore storage 112 but where the file content of the files is missing from the exposed full image backup 122 or from the restore storage 112. This filtering of the directory enumeration may involve the FEP 130 that was employed during the creation of the full image backup 122. This filtering may enable a decrease in the overall size requirements of the exposed full image backup 122 or of the restore storage 112, a decrease in the bandwidth overhead of transporting the full image backup 122, and/or a decrease in the processing time associated with exposing full image backup 122 or restoring the full image backup 122 to the restore storage 112 since the filtering may take place post-exposure or post-restoration, thus not delaying the exposure of the restoration.

Figure 3:
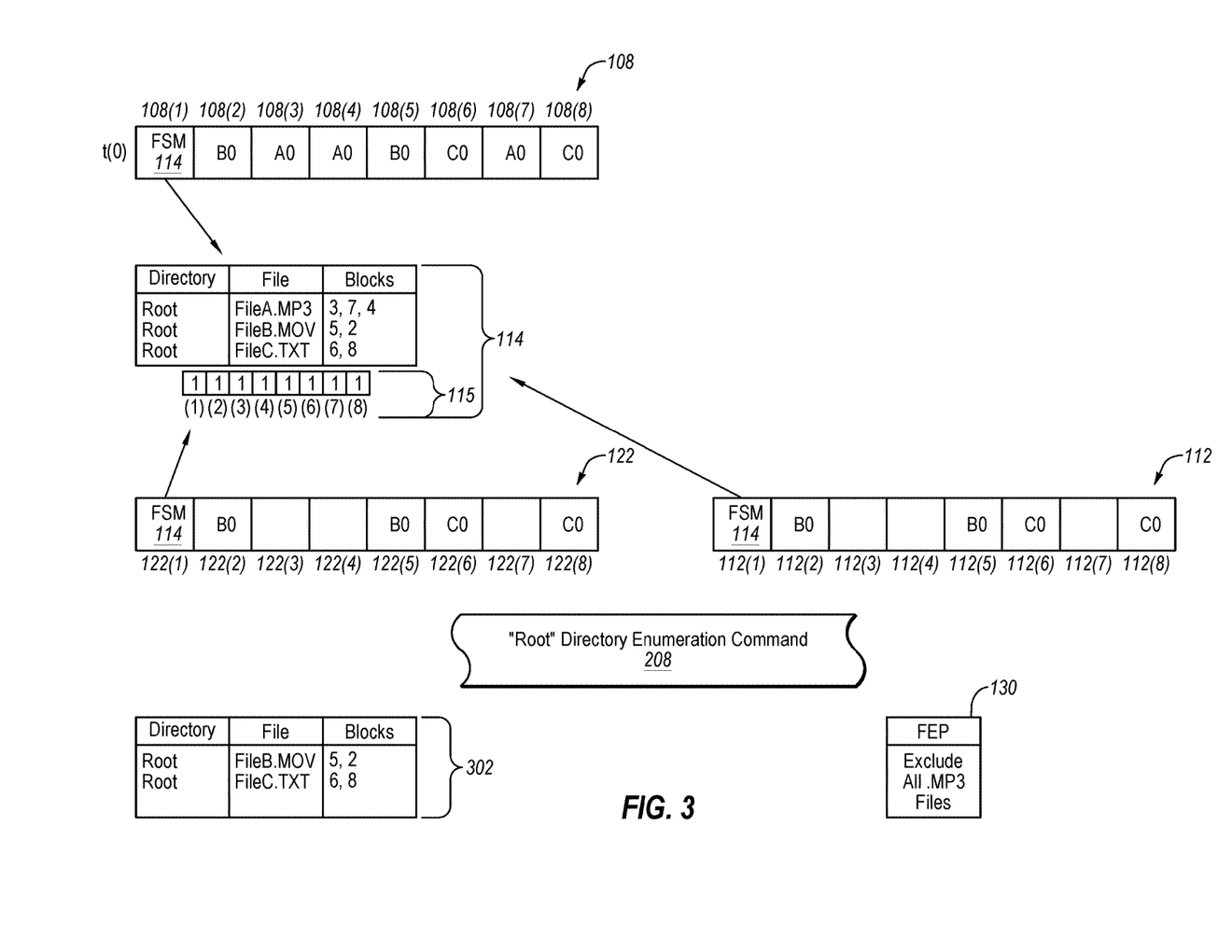
FIG. 3 is a schematic flowchart illustrating the creating of an image backup with files with missing file content, the exposing of the image backup or the restoring of the image backup to a restore storage, and the subsequent filtering of a directory enumeration of a directory in the exposed or restored image backup to exclude the files with missing file content.

FIG. 3 is a schematic flowchart illustrating the creating of an image backup with files with missing file content, the exposing of the image backup or the restoring of the image backup to a restore storage, and the subsequent filtering of a directory enumeration of a directory in the exposed or restored image backup to exclude the files with missing file content. As disclosed in FIG. 3, the source storage 108 includes eight blocks having positions 108(1)-108(8). The block positions in FIG. 3 having a label therein represent blocks that are allocated at the time indicated. The blank blocks in the storage 108 or 112 of FIG. 3 represent blocks in the storage 108 or 112 that are free at the time indicated. The blank blocks in the full image backup 122 of FIG. 3 may or may not actually exist in the backup 122, but are generally illustrated to indicate that no corresponding blocks from the source storage 108 has been included in the backup 122. The labels in the block positions of FIG. 3 include a letter to identify the block as corresponding to file content of a particular file and a number to identify the state of the block at a particular point in time. For example, the block labeled AO in FIG. 3 identifies the block as corresponding to file content of a file named FileA.MP3 and also identifies the state of the block at time t(0).

FIG. 3 illustrates the source storage 108 at time t(0), the full image backup 122 representing the state of the source storage at time t(0) but with unwanted file content having been excluded, and the restore storage 112 after the full image backup 122 has been restored to the restore storage 112. FIG. 3 also illustrates the FSM 114 of the source storage at time t(0), which is also backed up in the full image backup 122, an FEP 130 that is employed during the creation of the full image backup 122 and may be employed during a post-exposing or post-restoration filtering of the full image backup 122, and the filtered directory enumeration 302 of the restore storage 112 with missing files excluded.

In particular, the FSM 114 at time t(0), which is stored in the source storage 108 at position 108(1), indicates that the source storage 108 includes three files named FileA.MP3, FileB.MOV, and FileC.TXT. FileA.MP3 includes file content blocks at positions 108(3), 108(7), and 108(4), FileB.MOV includes file content blocks at positions 108(5) and 108(2), and FileC.TXT includes file content blocks at positions 108(6) and 108(8). The FSM 114 also include an FSBAM 115 which indicates which positions of the source storage 108 at time t(0) include allocated blocks, with allocated blocks indicated by a 1 and free blocks indicated by a 0.

During the creation of the full image backup 122, the FEP 130 directs the exclusion of the file content of all .MP3 files, and may be employed to identify FileA.MP3 as a file for which the file content should be excluded from the full image backup 122. This exclusion can be accomplished by excluding the blocks at positions 108(3), 108(7), and 108(4) of the source storage 108 from the full image backup 122 because these blocks correspond to file content of FileA.MP3. However, as illustrated in FIG. 3, the copy of the FSM 114 that is stored as part of the full image backup 122 continues to list FileA.MP3, and the FSBAM 115 of the FSM 114 continues to indicate that the file content blocks of FileA.MP3 at positions 108(3), 108(7), and 108(4) are allocated. This continued listing of FileA.MP3 in the FSM 114 of the full image backup 122 despite the file content blocks of FileA.MP3 having been excluded from the full image backup 122 may ensure data integrity within a chain of any subsequent incremental image backups that depend on the full image backup 122, such as incremental chain made up of the incremental image backups 124, 126, and 128 of FIG. 1.

During the exposure of the full image backup 122 to file system commands, such as directory enumeration commands, the FSM 114 may be left without modification in the full image backup 122, thus decreasing the processing time associated with exposing the full image backup 122, since any filtering of the FSM 114 may take place post-exposure, thus not delaying the exposure. Similarly, during the restoration of the full image backup 122 to the restore storage 112, the FSM 114 may be restored without modification from the full image backup 122, thus decreasing the processing time associated with restoring the full image backup 122 to the restore storage 112 since any filtering of the FSM 114 may take place post-restoration, thus not delaying the restoration.

Subsequently, upon receipt of the directory enumeration command 208 for the root directory of either the exposed full image backup 122 or of the restore storage 112, the filter module 204 of FIG. 2 may generate, or collaborate with the file system functionality module 206 to generate, a filtered directory enumeration 302 that excludes files where the files are listed in FSM 114 for the root directory of the file system of the exposed full image backup 122 or of the restore storage 112, such as FileA.MP3, but where the file content of the files is missing from the exposed full image backup 122 or from the restore storage 112. The FEP 130 may be employed in this filtering to identify, for example, that FileA.MP3 should be excluded from the filtered directory enumeration 302 because the FEP 130 directs the exclusion of all .MP3 files.

This filtering may enable a decrease in the overall size requirements of the exposed full image backup 122 and of the restore storage 112, a decrease in the bandwidth overhead of transporting the full image backup 122, and/or a decrease in the processing time associated with exposing the exposed full image backup 122 or restoring the full image backup 122 to the restore storage 112 since the filtering may take place post-exposure or post-restoration, thus not delaying the exposure or the restoration.

It is understood that although FIG. 3 discloses the scale of the source storage 108 including only eight blocks, and the files on the source storage 108 including only two or three blocks, in practice the source storage 108 may include at least billions of blocks, and each file may also include at least billions of blocks. For example, a single digital movie file (a .MOV file) may include billions of blocks, and the exclusion of such a digital movie file from a backup will result in the backup being billions of blocks smaller in size.

Figure 4:
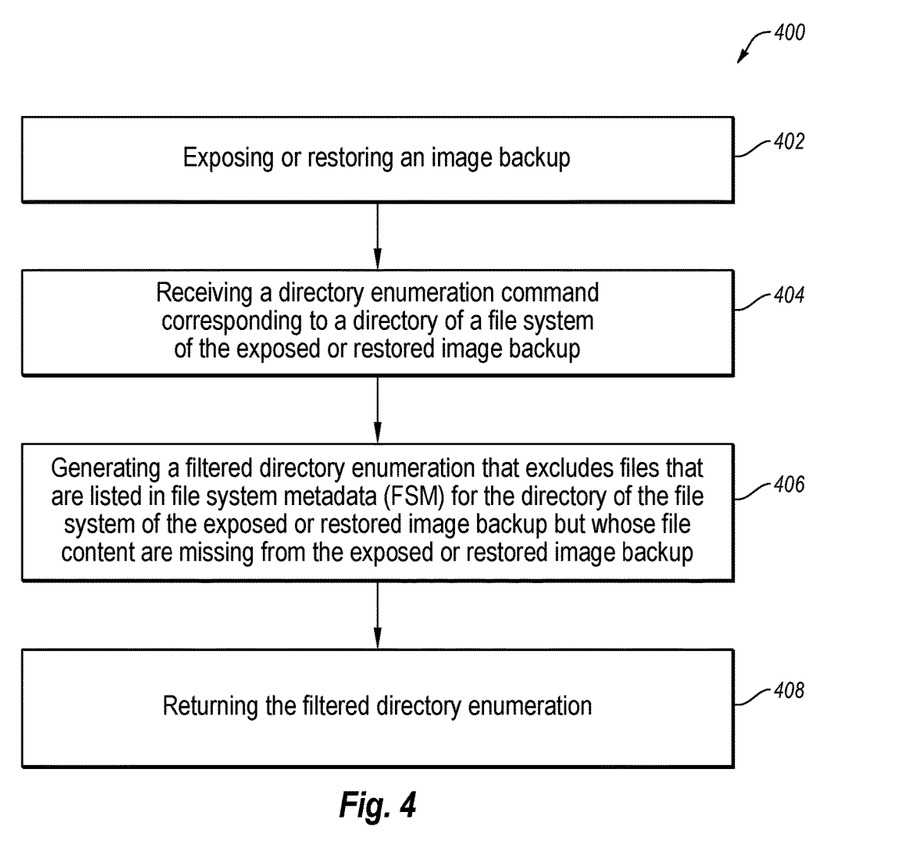
FIG. 4 is a schematic flowchart diagram of an example method of filtering a directory enumeration of a directory to exclude files with missing file content.

FIG. 4 is a schematic flowchart diagram of example method 400 of filtering a directory enumeration of a directory to exclude files with missing file content. The method 400 may be implemented, in at least some embodiments, by the filter module 204 and the file system functionality module 206 of FIG. 2 and the restore module 118 of FIG. 1. For example, the filter module 204 and the file system functionality module 206 of FIG. 2 and the restore module 118 of FIG. 1 may be one or more programs, stored on one or more non-transitory computer readable media, that are configured, when executed, to cause one or more processors to perform operations of filtering a directory enumeration of a directory to exclude missing files, as represented by one or more steps of the method 400. Although illustrated as discrete steps, various steps may be divided into additional steps, combined into fewer steps, reordered, or eliminated, depending on the desired implementation. The method 400 will now be discussed with reference to FIGS. 1-4.

The method 400 of FIG. 4 may include a step 402 of exposing or restoring an image backup. For example, the restore module 118 of FIG. 1 may, at step 402, expose the full image backup 122 of the source storage 108 of FIG. 1 to directory enumeration commands or restore the full image backup 122 of the source storage 108 to the restore storage 112 of FIG. 1, as disclosed in FIGS. 2 and 3.

The directory enumeration commands to which the full image backup 122 is exposed at step 402 may be standard file system directory enumeration commands. Further, the exposing of the full image backup 122 to the standard file system directory enumeration commands at step 402 may include mounting the full image backup 122 as a virtual device.

Alternatively, the directory enumeration commands to which the full image backup 122 is exposed at step 402 may be directory enumeration commands that are specific to a particular software application, such as the application 202 of FIG. 2. Further, the exposing of the full image backup 122 to the directory enumeration commands that are specific to the particular software application at step 402 may include exposing the full image backup 122 to the particular software application, such as the application 202, through the file system functionality module 206.

The method 400 may include a step 404 of receiving a directory enumeration command corresponding to a directory of a file system of the exposed or restored image backup. Continuing with the above example, the filter module 204 of FIG. 2 may, at step 404, intercept, or otherwise receive, the directory enumeration command 208 corresponding to the root directory of a file system of the exposed full image backup 122 of FIG. 2 or of the restore storage 112 of FIG. 2.

The directory enumeration command received at step 404 may be a standard file system directory enumeration command that is received from a standard file system, such as where the file system functionality module 206 of FIG. 2 is actually a standard file system, or may be specific to a particular software application and received from the particular software application, such as the application 202 of FIG. 2.

The method 400 may include a step 406 of generating a filtered directory enumeration that excludes files where the files are listed in FSM for the directory of the file system of the exposed or restored image backup but where the file content of the files is missing from the exposed or restored image backup. Continuing with the above example, the filter module 204 and/or the file system functionality module 206 of FIG. 2 may, at step 406, generate a filtered directory enumeration that excludes files where the files are listed in the FSM 114 for the root directory of the file system of the exposed full image backup 122 of FIG. 2 or of the restore storage 112 of FIG. 2 but where the file content of the files is missing from the exposed full image backup 122 of FIG. 2 or from the restore storage 112 of FIG. 2. Continuing with this example, the filter module 204 and/or the file system functionality module 206 of FIG. 2 may, at step 406, generate a filtered directory enumeration 302 of the root directory of FIG. 3 that excludes FileA.MP3 because even though FileA.MP3 is listed in the FSM 114 of the full image backup 122 of FIG. 3 and of the restore storage 112 of FIG. 3, the file content of FileA.MP3 is missing from the exposed full image backup 122 of FIG. 3 and from the restore storage 112 of FIG. 3.

The generating of the filtered directory enumeration at step 406 may include modifying the directory enumeration command to exclude files where the files are listed in the FSM for the directory of the file system of the exposed or restored image backup but where the file content of the files is missing from the exposed or restored image backup, and then executing the modified directory enumeration command on the exposed or restored image backup to generate the filtered directory enumeration. For example, the generating of the filtered directory enumeration 302 of FIG. 3 at step 406 may include modifying the directory enumeration command 208 itself for the root directory to exclude FileA.MP3, and then executing the modified directory enumeration command 208 of FIG. 3 on the exposed full image backup 122 of FIG. 3 or on the restore storage 112 of FIG. 3.

Alternatively, the generating of the filtered directory enumeration at step 406 may include executing the directory enumeration command on the exposed or restored image backup to generate a directory enumeration then filtering the directory enumeration to exclude files where the files are listed in the FSM for the directory of the file system of the exposed or restored image backup but where the file content of the files is missing from the exposed or restored image backup. For example, the generating of the filtered directory enumeration 302 of FIG. 3 at step 406 may include executing the root directory enumeration command 208 on the exposed full image backup 122 of FIG. 3 or on the restore storage 112 of FIG. 3 to generate a directory enumeration then filtering the directory enumeration to exclude FileA.MP3, resulting in the filtered directory enumeration 302.

The method 400 may include, either as part of step 406 or separate from step 406, identifying files where the files are listed in the FSM for the directory of the file system of the exposed image backup but where the file content of the files is missing from the exposed image backup.

This identifying may include identifying files that are listed in the FSM for the directory of the file system of the exposed or restored image backup that correspond to an FEP that is associated with the image backup. For example, identifying FileA.MP3 may include identifying FileA.MP3 because it corresponds to the FEP 130 of FIG. 3 that is associated with the full image backup 122 of FIG. 3 and which excludes all .MP3 files.

Alternatively, this identifying may include identifying files that are listed in the FSM for the directory of the file system of the exposed or restored image backup that correspond to a user-specified list of excluded files that is associated with the image backup. For example, identifying FileA.MP3 may include identifying FileA.MP3 because it corresponds to a user-specified list of excluded files that may be associated with the exposed full image backup 122 of FIG. 3 and/or with the restore storage 112 of FIG. 3 and that lists FileA.MP3 as an excluded file.

Alternatively, this identifying may include accessing an FSBAM of the FSM of the file system of the exposed image backup, identifying a list of missing blocks that are indicated as being allocated in the FSBAM but that are missing from the exposed image backup, and identifying files where the files are listed in the FSM for the directory of the file system of the exposed image backup but where the blocks of file content of the files are among the list of missing blocks. For example, identifying FileA.MP3 of FIG. 3 may include accessing the FSBAM 115 of the FSM 114 of FIG. 3 of the file system of the exposed full image backup 122 of FIG. 3, identifying a list of missing blocks that includes the blocks at positions 122(3), 122(7), and 122(4) that are indicated as being allocated in the FSBAM 115 but that are missing from the exposed full image backup 122 of FIG. 3, and identifying FileA.MP3 as being a file where the file is listed in the FSM 114 for the root directory but where the blocks of file content of the file are listed in the list of missing blocks.

The method 400 may include, either as part of step 406 or separate from step 406, pruning the FSM in the exposed image backup to exclude files from the directory where the file content of the files is missing from the exposed image backup. For example, once FileA.MP3 has been identified as being listed in the FSM 114 of FIG. 3 but also identified as having missing file content in the exposed full image backup 122 of FIG. 3 or in the restore storage 112 of FIG. 3, the metadata associated with FileA.MP3 may be pruned out of the FSM 114 so that the next time the FSM 114 for the root directory is accessed, no filtering need take place in order to generate an accurate directory enumeration for the root directory.

The method 400 may include a step 408 of returning the filtered directory enumeration. Continuing with the above example, the filter module 204 of FIG. 2 may, at step 408, return the filtered directory enumeration 302 of FIG. 3 to the application 202.

The embodiments described herein may include the use of a special-purpose or general-purpose computer, including various computer hardware or software modules, as discussed in greater detail below.

Embodiments described herein may be implemented using non-transitory computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store one or more desired programs having program code in the form of computer-executable instructions or data structures and which may be accessed and executed by a general-purpose computer, special-purpose computer, or virtual computer such as a virtual machine. Combinations of the above may also be included within the scope of computer-readable media.

Computer-executable instructions comprise, for example, instructions and data which, when executed by one or more processors, cause a general-purpose computer, special-purpose computer, or virtual computer such as a virtual machine to perform a certain method, function, or group of methods or functions. Although the subject matter has been described in language specific to structural features and/or methodological steps, it is to be understood that the subject matter defined in the appended claims is not necessarily limited to the specific features or steps described above. Rather, the specific features and steps described above are disclosed as example forms of implementing the claims.

As used herein, the term "module" may refer to software objects or routines that execute on a computing system. The different modules or filters described herein may be implemented as objects or processes that execute on a computing system (e.g., as separate threads). While the system and methods described herein are preferably implemented in software, implementations in hardware or a combination of software and hardware are also possible and contemplated.

All examples and conditional language recited herein are intended for pedagogical objects to aid the reader in understanding the example embodiments and the concepts contributed by the inventor to furthering the art, and are to be construed as being without limitation to such specifically-recited examples and conditions.

The invention claimed is:

1. A method for filtering a directory enumeration of a directory of an image backup, the method comprising:
    exposing an image backup to directory enumeration commands, the image backup listing a particular file as existing in a directory of the image backup even though the file content of the particular file is missing from the exposed image backup;
    receiving a directory enumeration command corresponding to the directory of the exposed image backup;
    generating a filtered directory enumeration that excludes the particular file; and
    returning the filtered directory enumeration.

2. The method as recited in claim 1, wherein:
    the directory enumeration commands are standard file system directory enumeration commands; and
    the exposing of the image backup to the standard file system directory enumeration commands includes mounting the image backup as a virtual device.

3. The method as recited in claim 1, wherein:
the directory enumeration commands are directory enumeration commands that are specific to a particular software application; and
the exposing of the image backup to the directory enumeration commands that are specific to the particular software application includes exposing the image backup to the particular software application.

4. The method as recited in claim 1, wherein the generating of the filtered directory enumeration includes:
modifying the directory enumeration command to exclude the particular file; and
executing the modified directory enumeration command on the exposed image backup to generate the filtered directory enumeration.

5. The method as recited in claim 1, wherein the generating of the filtered directory enumeration includes:
executing the directory enumeration command on the exposed image backup to generate a directory enumeration; and
filtering the directory enumeration to exclude the particular file.

6. The method as recited in claim 1, further comprising:
identifying the particular file by identifying any file that is listed in file system metadata (FSM) for the directory of a file system of the exposed image backup that corresponds to a file exclusion policy that is associated with the image backup.

7. The method as recited in claim 1, further comprising:
identifying the particular file by identifying any file that is listed in file system metadata (FSM) for the directory of a file system of the exposed image backup that corresponds to a user-specified list of excluded files that is associated with the image backup.

8. The method as recited in claim 1, further comprising:
identifying the particular file by:
accessing a file system block allocation map (FSBAM) of file system metadata (FSM) of the file system of the exposed image backup;
identifying a list of missing blocks that are indicated as being allocated in the FSBAM but that are missing from the exposed image backup; and
identifying any file where the file is listed in the FSM for the directory of the file system of the exposed image backup but where the blocks of file content of the file are among the list of missing blocks.

9. The method as recited in claim 1, further comprising:
pruning file system metadata (FSM) in the exposed image backup to exclude files from the directory where the file content of the files is missing from the exposed image backup.

10. One or more non-transitory computer-readable media storing one or more programs that are configured, when executed, to cause one or more processors to perform the method as recited in claim 1.

11. A method for filtering a directory enumeration of a directory of an image backup, the method comprising:
restoring an image backup of a source storage to a restore storage, the restored image backup listing a particular file as existing in a directory of the restored image backup even though the file content of the particular file is missing from the restored image backup;
receiving a directory enumeration command corresponding to the directory of the restored image backup;
generating a filtered directory enumeration that excludes the particular file; and
returning the filtered directory enumeration.

12. The method as recited in claim 11, wherein the directory enumeration command is a standard file system directory enumeration command and is received from a standard file system.

13. The method as recited in claim 11, wherein the directory enumeration command is specific to a particular software application and is received from the particular software application.

14. The method as recited in claim 11, wherein the generating of the filtered directory enumeration includes:
modifying the directory enumeration command to exclude the particular file; and
executing the modified directory enumeration command on the restored image backup to generate the filtered directory enumeration.

15. The method as recited in claim 11, wherein the generating of the filtered directory enumeration includes:
executing the directory enumeration command on the restored image backup to generate a directory enumeration; and
filtering the directory enumeration to exclude the particular file.

16. The method as recited in claim 11, further comprising:
identifying the particular file by identifying any file that is listed in file system metadata (FSM) for the directory of a file system of the restored image backup that corresponds to a file exclusion policy (FEP) that is associated with the image backup.

17. The method as recited in claim 11, further comprising:
identifying the particular file by identifying any file that is listed in file system metadata (FSM) for the directory of a file system of the restored image backup that corresponds to a user-specified list of excluded files that is associated with the image backup.

18. The method as recited in claim 11, further comprising:
pruning file system metadata (FSM) in the restored image backup to exclude files from the directory where the file content of the files is missing from the restored image backup.

19. One or more non-transitory computer-readable media storing one or more programs that are configured, when executed, to cause one or more processors to perform the method as recited in claim 11.

* * * * *